| United States Patent [19] | [11] Patent Number: 4,529,652 |
|---|---|
| Bussink et al. | [45] Date of Patent: Jul. 16, 1985 |

[54] FLAME RETARDANT POLYPHENYLENE ETHER COMPOSITION

[75] Inventors: Jan Bussink, Bergen op Zoom; Johannes W. J. de Munck, Huybergen, both of Netherlands

[73] Assignee: General Electric Company, Selkirk, N.Y.

[21] Appl. No.: 589,840

[22] Filed: Mar. 15, 1984

[51] Int. Cl.³ .......................... C08K 5/52; C08L 71/04
[52] U.S. Cl. ............................. 428/379; 174/110 A; 174/110 SR; 174/110 SY; 524/141; 524/143
[58] Field of Search ................ 524/141, 143; 428/379; 174/110 A, 110 SR, 110 SY

[56] References Cited

U.S. PATENT DOCUMENTS

| 3,974,235 | 8/1976 | Cooper et al. | 524/141 |
|---|---|---|---|
| 3,981,841 | 9/1976 | Abolins et al. | 524/141 |
| 4,239,673 | 12/1980 | Lee, Jr. | 524/141 |
| 4,263,426 | 4/1981 | Cooper et al. | 528/212 |
| 4,298,514 | 11/1981 | Lee, Jr. | 524/141 |
| 4,373,045 | 2/1983 | Cooper et al. | 524/141 |

*Primary Examiner*—Lester L. Lee

[57] ABSTRACT

The invention relates to a polymer composition based on a polyphenylene ether which is suitable for wire insulation extrusion. The polymer composition comprises a polyphenylene ether, optionally a polystyrene, a hydrogenated block copolymer, an aromatic phosphate compound, a mineral oil and optionally typical additives. The invention also relates to an electrically conductive wire comprising an insulation built up from the above-mentioned polymer composition and provided around the electrically conductive wire by wire insulation extrusion.

7 Claims, No Drawings

FLAME RETARDANT POLYPHENYLENE ETHER COMPOSITION

The invention relates to a polymer composition having flame-retarding properties, suitable for wire insulation extrusion, based on polyphenylene ether. The invention also relates to an electrically conductive wire having an insulation of synthetic resin which is provided by wire insulation extrusion and is built up from the polymer composition according to the invention.

Known polymer compositions for wire insulation extrusion of electrically conductive wires comprise a polymer as a synthetic resin: so far, polyvinyl chloride and polyethylene have been used in particular as a polymer.

Special requirements are imposed upon polymer mixtures for wire insulation extrusion: it must be possible to process the mixture by wire insulation extrusion, the mixture must have flame-retarding properties after the wire insulation extrusion the mixture must have an elongation of more than 100%, the mixture should not be sensitive to strain corrosion and aging and must have a good impact strength. In some applications the requirement is imposed that the polymer mixture may not comprise any halogen atoms.

The invention provides a polymer composition based on a polyphenylene ether which satisfies the above-mentioned requirements.

The polymer composition according to the invention is characterized in that it comprises the following constituents: 50–70 parts by weight of polyphenylene ether, 0–20 parts by weight of polystyrene or a saturated-rubber-modified polystyrene, 25–45 parts by weight of a hydrogenated block copolymer having blocks consisting of homopolymers or copolymers of vinyl aromatic hydrocarbons and having blocks derived from a conjugated diene, 10–20 parts by weight of aromatic phosphate compound, 2–10 parts by weight of mineral oil, 0–10 parts by weight of typical additives.

The polymer compositions according to the invention cannot be formed into an article by injection moulding. When the polymer compositions according to the invention are injection-moulded, delamination occurs. On the other hand, the polymer compositions according to the invention can well be processed by wire insulation extrusion without noticeable delamination occurring.

To be preferred is a polymer composition which comprises 50–65 parts by weight of polyphenylene ether 5–15 parts by weight of homopolystyrene, 30–40 parts by weight of hydrogenated block copolymer, 15–20 parts by weight of aromatic phosphate compound, 4–8 parts by weight of mineral oil and 0–5 parts by weight of the typical additives.

Polymer compositions which comprise a polyphenylene ether, polystyrene, or a rubber-modified polystyrene, a hydrogenated block copolymer and an aromatic phosphate compound are known per se. For this purpose, reference may be made to U.S. Pat. No. 4,143,095 and the German Patent Application Nos. 24 34 848 and 30 38 551. The polymer compositions described in these patent publications are extruded to pellets and are then formed into an article by injection moulding.

These known polymer compositions are not suitable for wire insulation extrusion because in one or more respects they do not satisfy the above-mentioned requirements for materials which are suitable for being provided around an electrical conductor by wire insulation extrusion.

Polymer compositions which comprise a polyphenylene ether, a block copolymer and a mineral oil, are known from the PCT Patent Application No. WO 81/02020. These known polymer compositions are also extruded to pellets and are formed into articles by means of injection moulding. However, these known polymer compositions are not suitable as a wire insulation for electrical conductors.

Polyphenylene ethers and their preparation are known per se from a large number of patent publications, inter alia from the U.S. Pat. Nos. 3,306,874, 3,306,875, 3,257,357 and 3,257,358. The polymer composition according to the invention may comprise one or more of the known polyphenylene ethers, notably also homopolymers and copolymers. The polyphenylene ether in the polymer composition according to the invention preferably comprises units derived from 2,6-dimethyl phenol.

The polymer compositions according to the invention may comprise polystyrenes or a saturated-rubber-modified polystyrene. Polystyrene is to be understood to mean in this Specification homopolymers and copolymers comprising units derived from styrene or substituted styrene compounds, for example alpha-methyl styrene. All the known copolymers of styrene with the exception of the copolymers which comprise unsaturated bonds may be used, for example styrene-acrylonitrile copolymers. Polystyrenes modified with saturated rubbers are known per se. Examples are the polystyrene compounds saturated with EPDM rubber or ethyleneethylacrylate rubber.

Hydrogenated block copolymers suitable for the polymer compositions according to the invention comprise blocks built up from a vinyl aromatic compound, for example, styrene, and blocks built up from a hydrogenated diene compound, for example butadiene. Suitable are linear block copolymers, radial teleblock copolymers and so-called "tapered" block copolymers, i.e. block copolymers built up from blocks which are bonded together via a "random" copolymer of the vinyl aromatic compound and (hydrogenated) diene compound. Suitable block copolymers are commercially available, for example from Shell under the name of Kraton G.

Suitable aromatic phosphate compounds which are present in the polymer compositions according to the invention are described, for example, in U.S. Pat. No. 4,143,095. Triphenyl phosphate and diphenyl cresyl phosphate may be mentioned in particular.

The polymer compositions according to the invention comprise a comparatively large quantity of mineral oil. In combination with the above-mentioned constituents and the above-mentioned relative quantities of the said constituents, a polymer composition is obtained having the properties desired for wire insulation extrusion, due to the presence of the mineral oil. As a mineral oil there may be used aromatic, naphtenic and paraffinic oils or a mixture of one or more of such oils. Paraffinic and/or naphthenic oils are to be preferred.

In addition to the above-mentioned constituents, the polymer compositions according to the invention may also comprise further additives which are typical for compositions comprising polyphenylene ether. Stabilizing additives, for example phosphites, and metal compounds (ZnO, ZnS), dyes and pigments, lubricants may be mentioned in particular.

The invention will now be described in greater detail with reference to the following specific examples:

EXAMPLES I to XI

Comparative Examples 1 and 2

Various polymer compositions were prepared as indicated in Table A hereinafter: the polymer compositions I to XI according to the invention and the polymer compositions 1 and 2 for comparison.

The polymer compositions were prepared by dry-mixing the indicated constituents in a mixer until a homogeneous composition was obtained. These homogeneous compositions were then extruded by means of a double blade extruder type Werner-Pfleiderer ZSK 28 having a special kneading and dispersing blade. The blade of the extruder was rotated at a speed of 200–400 rpm; the temperature of the extruder was adjusted at 240–320° C.; flow rate 5–25 kg per hour. The extrudate was cooled with water and chopped to form a granulate.

Test samples were manufactured from the resulting extrudate by injection moulding (T 250°–300° C.) and a few properties were determined.

The various extrudates as mentioned hereinbefore were provided around an electrically conductive copper wire by means of a wire insulation extrusion device as is generally used to insulate an electrically conductive wire with PVC. The copper wire was preheated at 60°–110° C.; the extrusion temperature was approximately 250° C. The resulting wire insulation was evaluated for its appearance. The wire insulation was removed from the copper wire and the elongation of the wire insulation was determined (elongation at rupture).

All results are recorded in Table B below.

From the data of Table B it is apparent that all polymer compositions according to the invention after wire insulation extrusion have a sufficient elongation; the comparative samples have too low an elongation value. It may be seen from a comparison of the results obtained in Examples VIII, IX and X that the use of paraffinic or naphtenic oils is to be preferred instead of aromatic oils. This appears from a more favorable value of the elongation of the insulation. All polymer compositions have good to very good flame retarding properties as appears from the indicated UL (Underwriters Laboratories) 94 and the LOI values.

TABLE A

| Composition in parts by weight | 1 | 2 | I | II | III | IV | V | VI | VII | VIII | IX | X | XI |
|---|---|---|---|---|---|---|---|---|---|---|---|---|---|
| Polyphenylene ether (poly 2,6-dimethylphenylene ether) | 50 | 65 | 50 | 65 | 50 | 65 | 50 | 50 | 50 | 50 | 50 | 50 | 50 |
| homopolystyrene | 15 | 0 | 15 | 0 | 15 | 0 | 15 | 15 | 5 | 10 | 10 | 10 | 0 |
| EPDM-rubber (9–10%) - modified polystyrene | 0 | 0 | 0 | 0 | 0 | 0 | 0 | 0 | 0 | 0 | 0 | 0 | 15 |
| hydrogenated styrene butadiene triblock copolymer | 25 | 25 | 25 | 25 | 25 | 25 | 25 | 25 | 35 | 30 | 30 | 30 | 25 |
| mixture of diphenylcresyl phosphate and triphenyl phosphate | 10 | | 10 | 10 | 10 | 10 | 15 | 20 | 15 | 15 | 15 | 15 | 15 |
| paraffinic oil | 0 | 0 | 4 | 4 | 8 | 8 | 4 | 4 | 4 | 4 | 0 | 0 | 4 |
| naphthenic oil | 0 | 0 | 0 | 0 | 0 | 0 | 0 | 0 | 0 | 0 | 4 | 0 | 0 |
| aromatic oil | 0 | 0 | 0 | 0 | 0 | 0 | 0 | 0 | 0 | 0 | 0 | 4 | 0 |
| organic phosphite | 0.5 | 0.5 | 0.5 | 0.5 | 0.5 | 0.5 | 0.5 | 0.5 | 0.5 | 0.5 | 0.5 | 0.5 | 0.5 |
| ZnO | 0.15 | 0.15 | 0.15 | 0.15 | 0.15 | 0.15 | 0.15 | 0.15 | 0.15 | 0.15 | 0.15 | 0.15 | 0.15 |
| ZnS | 0.15 | 0.15 | 0.15 | 0.15 | 0.15 | 0.15 | 0.15 | 0.15 | 0.15 | 0.15 | 0.15 | 0.15 | 0.15 |

TABLE B

| | | 1 | 2 | I | II | III | IV | V | VI | VII | VIII | IX | X | XI |
|---|---|---|---|---|---|---|---|---|---|---|---|---|---|---|
| Properties of test pieces manufactured by injection moulding | | | | | | | | | | | | | | |
| Izod impact strength with notch ASTM D 256 | J/m | 615 | 600 | 595 | 570 | 540 | 550 | 605 | 590 | 605 | 610 | 595 | 595 | 615 |
| Thermal deformation temperature 1,82 N/mm$^2$, ASTM D 648 | °C. | 107 | 126.5 | 98.5 | 107.5 | 87 | 99.3 | 82 | 73.5 | 80.5 | 81.5 | 82 | 80.5 | 85 |
| UL 94 1.6 mm | sec. | 23-3 | 17-14 | 27-15 | 27-15 | 41-1 | 28-13 | 21-10 | 13-7 | 54-7 | 34-4 | 36-8 | 27-4 | 29-8 |
| LOI | % | 34.5 | 36 | 32.8 | 35 | 32 | 33.5 | 33 | 34 | 32 | 31.5 | 31 | 32.8 | 31.5 |
| Tensile strength at flow DIN 53455 | MPa | 46.5 | 45.5 | 38 | 41 | 31 | 33 | 34 | 33 | 28 | 32 | 34 | 36 | 33 |
| Elongation at rupture DIN 53455 | % | 45 | 44 | 68 | 60 | 70 | 76 | 75 | 80 | 106 | 82 | 86 | 70 | 98 |
| Melt viscosity 240° C., 4500 sec$^{-1}$ | Pa.s | 360 | 500 | 300 | 360 | 240 | 300 | 215 | 170 | 255 | 235 | 240 | 225 | 230 |
| Properties insulation after wire insulation extrusion | | | | | | | | | | | | | | |
| Surface | | not smooth | not smooth | good | reasonable | good | not smooth | good | very good | good | good | good | good | good |
| Elongation at rupture | % | 40 | 60 | 100 | 120 | 250 | 120 | 260 | 250 | 350 | 250 | 250 | 230 | 300 |

We claim:

1. A flame retardant polymer composition suitable for wire insulation extrusion comprising:
   (a) 50 to 70 parts by weight of a polyphenylene ether resin;
   (b) 0 to 20 parts by weight of an alkenyl aromatic resin selected from the group consisting of polystyrene and saturated-rubber-modified polystyrene;
   (c) 25 to 45 parts by weight of a hydrogenated block copolymer of a conjugated diene and a vinyl aromatic homopolymer or copolymer;

(d) 10 to 20 parts by weight of aromatic phosphate compound; and (e) 10 to 20 parts by weight of mineral oil.

2. A composition as in claim 1 wherein said polyphenylene ether resin is present in amount of 50 to 65 parts by weight of the total composition.

3. A composition as in claim 1 wherein said alkenyl aromatic resin is homopolystyrene and is present in an amount of 5 to 15 parts by weight of the total composition.

4. A composition as in claim 1 wherein said hydrogenated block copolymer is present in an amount of 30 to 40 parts by weight of the total composition.

5. A composition as in claim 1 wherein said aromatic phosphate compound is present in an amount of 15 to 20 parts by weight of the total composition.

6. A composition as in claim 1 wherein said mineral oil is present in an amount of 4 to 8 parts by weight of the total composition.

7. An insulated electrical wire comprising: an electrically conductive wire element having extruded thereon an insulation composition comprising:

(a) 50 to 70 parts by weight of a polyphenylene ether resin;

(b) 0 to 20 parts by weight of an alkenyl aromatic resin selected from the group consisting of polystyrene and saturated-rubber-modified polystyrene;

(c) 25 to 45 parts by weight of a hydrogenated block copolymer of a conjugated diene and a vinyl aromatic homopolymer or copolymer;

(d) 10 to 20 parts by weight of aromatic phosphate compound; and (e) 10 to 20 parts by weight of mineral oil.

* * * * *

UNITED STATES PATENT AND TRADEMARK OFFICE
CERTIFICATE OF CORRECTION

PATENT NO. : 4,529,652
DATED : July 16, 1985
INVENTOR(S) : Jan Bussink and Johannes W.J. de Munk It is certified that error appears in the above—identified patent and that said Letters Patent is hereby corrected as shown below:

In Claim 1, at Col. 5, line 3:

"(e) 10 to 20 parts by weight of mineral oil."

should read:

-- (e) 2 to 10 parts by weight of mineral oil. --

In Claim 7, at Col. 6, line 17:

"(e) 10 to 20 parts by weight of mineral oil."

should read:

-- (e) 2 to 10 parts by weight of mineral oil. --

Signed and Sealed this

Fifteenth Day of April 1986

[SEAL]

Attest:

DONALD J. QUIGG

Attesting Officer      Commissioner of Patents and Trademarks